(12) United States Patent
Jones et al.

(10) Patent No.: US 9,207,139 B2
(45) Date of Patent: Dec. 8, 2015

(54) MASS FLOW CONTROL MONITORING

(75) Inventors: Simon Jones, Cardiff (GB); Yiping Song, Thornbury (GB)

(73) Assignee: SPTS TECHNOLOGIES LIMITED, Newport, Gwent (GB)

( * ) Notice: Subject to any disclaimer, the term of this patent is extended or adjusted under 35 U.S.C. 154(b) by 608 days.

(21) Appl. No.: 13/479,965

(22) Filed: May 24, 2012

(65) Prior Publication Data

US 2013/0138385 A1 May 30, 2013

Related U.S. Application Data

(60) Provisional application No. 61/490,092, filed on May 26, 2011.

(30) Foreign Application Priority Data

May 26, 2011 (GB) .................................... 1108854.9

(51) Int. Cl.
*G01L 13/00* (2006.01)
*G01F 25/00* (2006.01)
*G06F 17/00* (2006.01)

(52) U.S. Cl.
CPC .............. *G01L 13/00* (2013.01); *G01F 25/0038* (2013.01); *G01F 25/0053* (2013.01); *G06F 17/00* (2013.01)

(58) Field of Classification Search
CPC ............ C23C 16/4408; G01F 25/0038; G01F 25/0053
USPC ........................................................ 702/138
See application file for complete search history.

(56) References Cited

U.S. PATENT DOCUMENTS

| 5,684,245 A | 11/1997 | Hinkle |
| 6,955,072 B2 | 10/2005 | Zarkar et al. |
| 7,822,570 B2 | 10/2010 | Shareef et al. |
| 2004/0261492 A1* | 12/2004 | Zarkar et al. .................. 73/1.34 |
| 2008/0115560 A1* | 5/2008 | Shareef et al. ................. 73/1.25 |

OTHER PUBLICATIONS

"PC2000 Process Tool User Interface and Control Software".

* cited by examiner

*Primary Examiner* — Toan Le
*Assistant Examiner* — Manuel Rivera Vargas
(74) *Attorney, Agent, or Firm* — Volentine & Whitt, PLLC

(57) ABSTRACT

A method of monitoring a Mass Flow Controller (MFC) connected to a pressure chamber for supplying gas to the chamber, which is an unpumped condition, includes cyclically switching the MFC to create successive fill cycles for a test period and measuring the chamber pressure at intervals during the test period. The method is characterised in that the total switch time of the MFC is at least 10% of the fill cycle and in that the method includes obtaining the average of the pressure measurements and comparing them with historical data to determine whether or not the MFC is functioning properly.

15 Claims, 3 Drawing Sheets

Figure 1 - 50SCCM Looping Fillrate

Figure 2 - Looped Fill rate Gradient over time.

MASS FLOW CONTROL MONITORING

BACKGROUND

This invention relates to a method for monitoring a Mass Flow Controller (MFC) connected to a pressure chamber for supplying gas to the chamber.

Mass Flow Controllers are used to supply measured flows of gas to pressure chambers for a range of processes including etching semi-conductor substrates and depositing films thereon. Accurate flow rates can be extremely significant in the reproducibility of the process and also inaccuracies of the flow rate could result in a different process being performed due to the change in proportion of chemicals within the chamber.

Systems have therefore been developed already for monitoring Mass Flow Controllers to identify problems in their operation. Typically these comprise arranging the desired flow rate at the MFC, allowing stabilising gas flow, allowing the fixed volume chamber to fill with gas for a fixed time or until a set pressure is achieved and determining the rate of fill of the gas into the chamber. During this test the chamber is not pumped. This rate value can be compared with a known good value to verify whether the MFC is operating correctly.

U.S. Pat. Nos. 7,822,570, 6,955,072 and 5,684,245 indicate various approaches to seeking to operate mass flow controllers.

Such a system is very practical for the historical relatively long process times. However, when using the well known switched Bosch process it is desirable to reduce the cyclic process time with the result that if the opening or closing times of the MFC vary from their design length, that deviation can become a significant part of the cycle time, causing distortions in the process for the reasons set out above. Put another way if there is a few milliseconds variation in the period of supply of gas to the chamber for a process or cycle which is going to last for many minutes, this leads to a negligible variation. If, however, the process or cycle time is significantly reduced, the lead or lag period in the operation of the MFC becomes a significant portion of the whole leading to process variations.

The Applicant has developed methods which can mitigate against this problem.

SUMMARY

From one aspect the invention consists in a method of monitoring a Mass Flow Controller (MFC) connected to a pressure chamber for supplying a gas to the chamber, which is in an unpumped condition, including cyclically switching the MFC to create successive fill cycles for a test period; and measuring the chamber pressure at intervals during the test period; characterised in that the total switch times of the MFC is at least 10 per cent of the fill cycle and in that the method includes obtaining the average of the pressure measurements and comparing them with historical data to determine whether or not the MFC is functioning properly.

It will be understood that by cycling the MFC frequently during the test period, the switch period is forced to become a significant part of the gas flow period, with the result that inaccuracies in switching will inevitably show up.

In a preferred embodiment the test period may be terminated when the chamber reaches a predetermined pressure or when a predetermined number of cycles have taken place.

Each cycle may include a fill step and a delay (no fill) step. The length of the fill and or delay steps may be varied during the test cycle. It is to be understood that, as would be typical in the switched Bosch process, the MFC is not necessarily fully closed and or fully opened during the cycle. The test will work if the MFC is substantially closed and substantially opened.

The cycle time may vary from about 0.1 seconds to about 60 seconds. In advanced switched Bosch processes times of <1 s are highly desirable. Depending on the relative length of the switch time and the intended process time, the number of cycles appropriate can be selected. There must be at least two.

The switch time for the MFC may be from about 10 milliseconds to about 200 milliseconds. The ratio of MFC switch time to cycle time may be between about 0.00017 and about 2.

Additionally the method may include obtaining the gradient of pressure measurements and comparing the gradient with historical data to determine whether or not the MFC is functioning properly.

Thus by plotting the gradients obtained over time, it is possible to determine whether or not the MFC is becoming slow to open or fast to open.

In a further aspect the invention consists in a method of monitoring the operation of a Mass Flow Controller (MFC) connected to a chamber of supplying gas thereto including initiating a test phase where the MFC cyclically opened and closed for a period; measuring the chamber pressure at intervals; determining the gradient of the pressure increase; and determining the historical trend of measured gradients over time to indicate progressive variation in the performance of the MFC.

BRIEF DESCRIPTION OF THE DRAWINGS

Although the invention has been defined above it may include an inventive combination of the features set out above or in the following scripture.

The invention may be performed in various ways and specific embodiment will now be described, by way of example, with reference to the accompanying drawings, in which.

DETAILED DESCRIPTION

As has been indicated the invention introduces the concept of a "short step/multi cycle" fill rate check, which can be used to identify MFCs that are slow to open or close.

Thus the Applicants propose that a test chamber fill rate is made up of a large number of short process steps whereby the MFC is turned on or off (or to a very low flow) for each successive step. This means the time taken for the MFC to turn the on/off makes up a significant portion of the total MFC 'on' time. Consequently any delays or variations in the on/off time should show up as a low/high fill rate reading thereby alerting the user to a problem.

Figure 1:
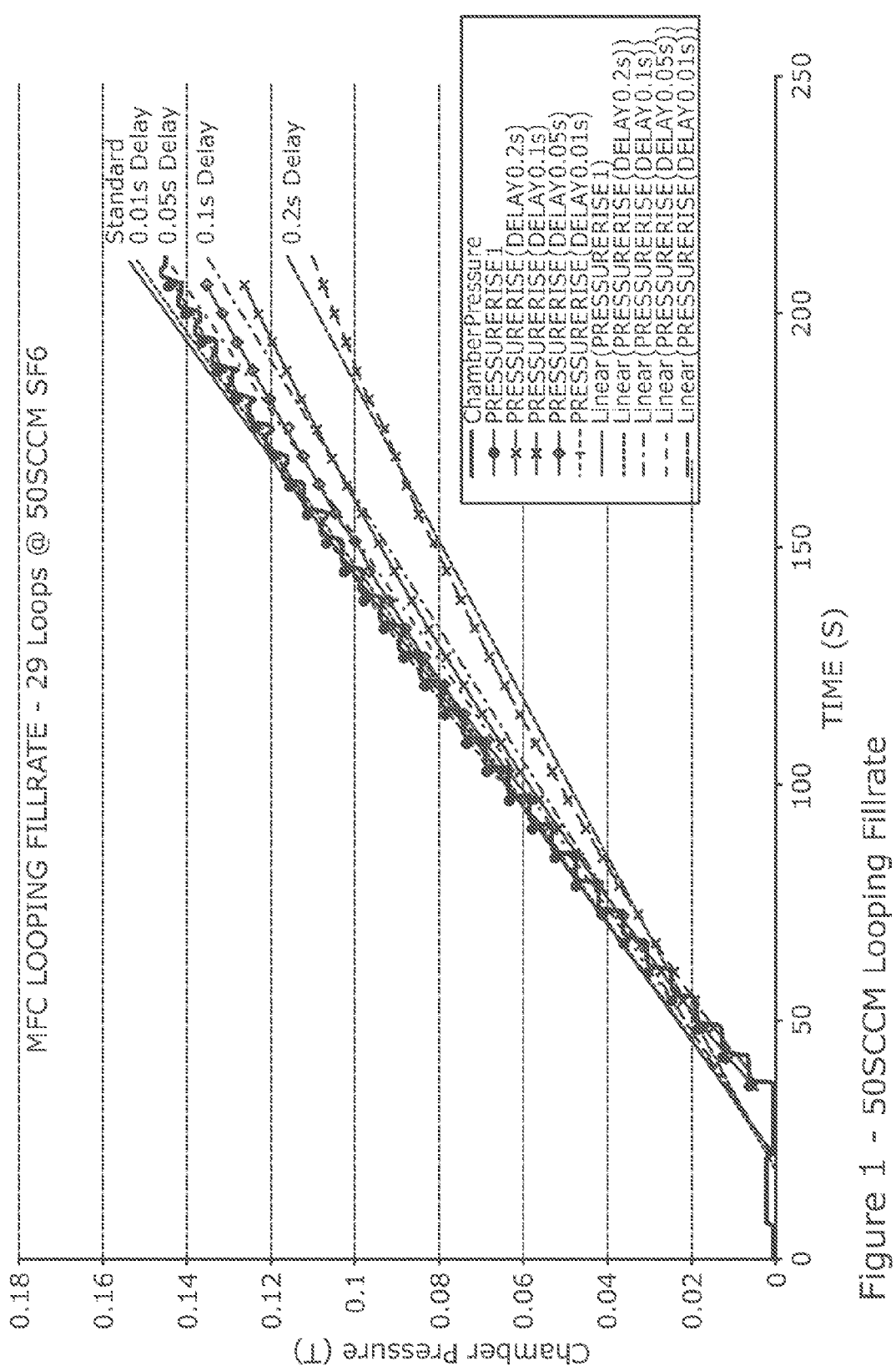
FIG. 1 illustrates a rise in chamber pressure against a looping or cyclic fill rate.

The test is particularly designed to pick up drift in MFC performance over a long period of the operation of the machine including the process chamber. Thus in FIG. 1, slow to open responses of an MFC are plotted. Each cycle of the fill rate contains a "fill" and a "measure" step, which can each be a variable length. The number of cycles can be varied, in part as a reflection of the length of period of the process which is to be performed in the chamber. The end of the fill rate test period can be triggered either by the pressure achieved or a fixed number of cycles.

The data from each loop or cycle in the fill rate can then be recorded by data logger. This data is used to plot the pressure/time graphs shown in FIG. 1. These can be used to calculate the gradient of the test line and this information is stored.

Figure 2:
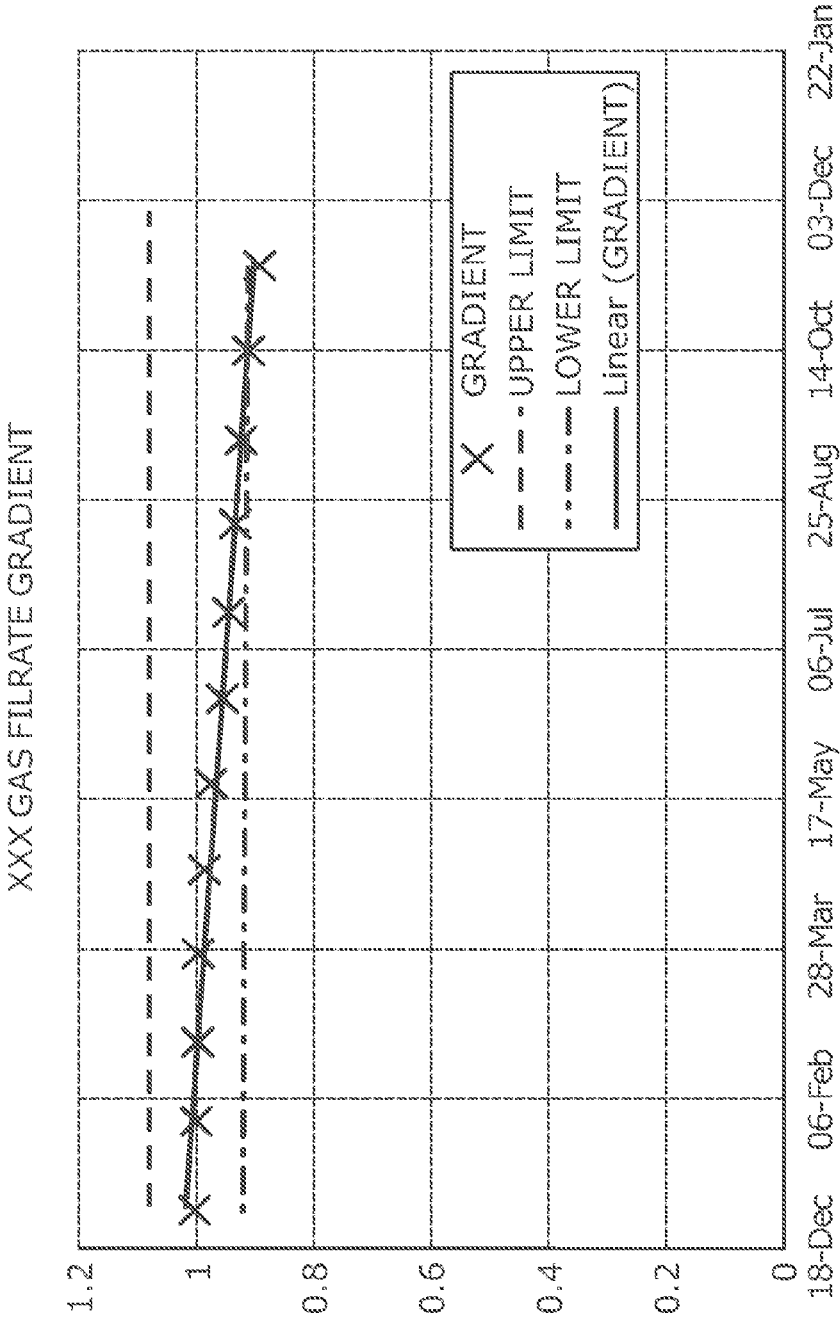
FIG. 2 shows variations in the fill rate gradient over time.

As can be seen in FIG. 2 test data over a period of time can be plotted on a graph of a gradient against elapsed time. If the MFC is performing consistently the line plotted would be a straight line. However, if it becomes slow to open this will produce a plot having a negative gradient, whereas if it is fast to open the plot will have a positive gradient. Limits can be set to alert machine operators that the fill rate is outside normal bounds.

If the MFC was both slow to open and slow to close, the gradient shown in FIG. 2 would not be effected.

This variation can be identified by stepping the MFC flow without setting the demand to 0 during each step so the value is dependant on the opening action of the MFC only. The MFC is ramped in equal steps until an ultimate chamber pressure is reached. This value is recorded in a data logger and a test is run a number of times to find the average value. The average value was then recorded and judged against upper and lower bounds. If the final pressure is decreased from the previous test the MFC can be said to be opening slowly. If the final pressure is increased from the previous test the MFC can be said to be opening quickly.

With current technology the opening time for an MFC is typically ~100 msec but may lie in the range 50 to 400 msec. Closing times are in the range of 30 to 600 msec depending on the MFC and a common model has a closing time of 50 msec. Thus in a typical cyclic process the MFC may be open fully after 100 msec and may remain open until 600 msec and then be fully closed at 650 msec. It is usual to wait about five seconds before the cycle starts again. The open period may ideally be reduced perhaps with closure starting at t=200 msec.

The most typical nature of failure is for the MFC to be slow to open but the looped fill approach discussed above could also identify leaking or slow to close MFCs. So for a conventional process (assuming that the fill rate cycle would be similar to the process time) the MFC opening and closing time may be in the region of 1 second, whilst the total fill cycle may be in the order of 60 seconds. However, when running the test process the fill time can be hugely shortened so that the MFC time of 1 second contrasts with a total fill cycle of 500 msec. The result is that the MFC open and close times are a much greater proportion of the whole. It is thought that for effective testing it may be desirable to have the total MFC open and close times greater than 10% of the fill step (i.e. fill time plus MFC time).

The method described above assumes that the chamber will be the working chamber but it could also most usefully be a separate chamber and this would prevent leakage faults in the working chamber contributing to the test results and perhaps falsely indicating a problem with the mass flow controller.

Figure 3:
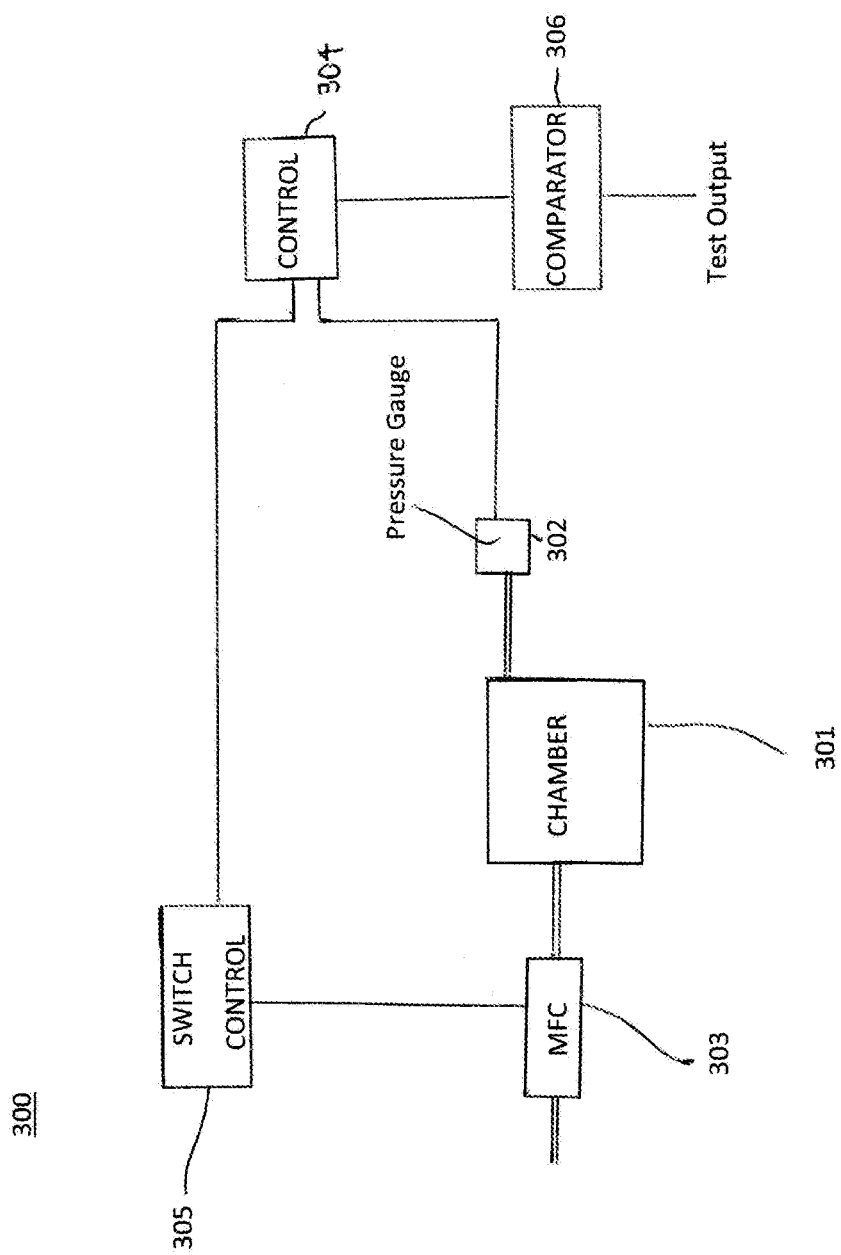
FIG. 3 shows an example of a system to which the methods of the invention may be applied.

FIG. 3 shows an example of a system to which the aforedescribed methods of the invention may be applied. As shown, the system 300 of this example includes a pressure chamber 301, a pressure gauge 302, a mass flow controller (MFC) 303, a control circuit 304, a switch control circuit 305, and a comparator circuit 306.

In an operational example, the MFC 303 is connected to a pressure chamber 301 for supplying gas to the chamber 301 which is an unpumped condition. The switch control circuit 305, in communication with the control circuit 304, cyclically switches the MFC 303 to create successive fill cycles for a test period; and the pressure gauge 302 is used to measure the chamber 301 pressure at intervals during the test period. The control circuit 304 obtains the average of the pressure measurements, and the comparator 306 compares them with historical data to generate a test output indicative of whether or not the MFC 303 is functioning properly.

In another operational example, the MFC 303 again is connected to a pressure chamber 301 for supplying gas to the chamber 301. Here, a test phase is initiated where the MFC 303 is cyclically opened and closed by the switch control 305 for a period; and the chamber 301 pressure is measured at intervals using the pressure gauge 302. The control circuit 304 determines the gradient of the pressure increase, and further determines the historical trend of measured gradients over time to generate a test output indicative of progressive variation in the performance of the MFC 303. The comparator 306 of FIG. 3 may be omitted in this operational example.

It will be understood that the circuits 304~306 may be implemented by electronic hardware, processor driven software, and/or a combination thereof, and that any two or more of these circuits 304~306 may be combined.

What is claimed is:

1. A method of monitoring a Mass Flow Controller (MFC) connected to a pressure chamber for supplying gas to the chamber, which is an unpumped condition, including:
   cyclically issuing on and off control signals to the MFC for switching the MFC towards on and off positions, respectively, to create successive fill cycles over the course of a test period; and
   measuring the chamber pressure at intervals during the test period,
   characterised in that the issuing of the on and off signals to the MFC is controlled such that the total time during which the MFC is specified to be opening and closing under the command of the on and off control signals over the course of the test period is at least 10% of the total time of the fill cycles over the course of the test period, and
   in that the method includes obtaining the average of the pressure measurements and comparing them with historical data to determine whether the MFC is functioning properly.

2. The method as claimed in claim 1, wherein each of the fill cycles includes a fill period and a delay period, the fill period being a period between the time a respective one of the on signals is issued for switching theMFC on and the time the MFC is specified to be off after a respective one of the off signals in succession to the respective on signal is issued, and the delay period is a period between the time the MFC is specified to be off and the issuing of a respective on signal in succession to the respective off control signal.

3. The method as claimed in claim 2 wherein the length of the fill period and/or the delay period is varied among the fill cycles during the test period.

4. The method of claim 1 wherein the test period is terminated when the chamber reaches a predetermined pressure.

5. The method as claimed in claim 1 wherein the test period is terminated after a predetermined number of the fill cycles.

6. The method as claimed in claim 1, wherein the issuing of the on and off signals is controlled such that the MFC is not fully closed when off and/or opened when on during each of the fill cycles.

7. The method as claimed in claim 1, wherein the issuing of the on and off signals is timed such that the duration of each of the fill cycles is from about 0.1 s to about 60 s.

8. The method as claimed in claim 1, wherein at least three cycles of the on and off signals are issued such that the test period includes at least three of the fill cycles.

9. The method as claimed in claim 1, wherein the time between the issuing of the on and off signals for the MFC in each of the fill cycles is between about 10 ms to about 200 ms.

10. The method as claimed in claim 1, wherein the ratio of a respective time between the issuing of the on and off signals for the MFC in at least one of the fill cycles to the total time of the fill cycles is between 0.00017 to 2.

11. The method as claimed in claim 1, including determining a gradient of the pressure measurements over time during the test period, and comparing the gradient with historical data to determine whether the MFC is functioning properly.

12. The method as claimed in claim 1, wherein the chamber is a process chamber of an etching or deposition apparatus in which an etching or deposition process takes place.

13. The method as claimed in claim 1, wherein the chamber is a test chamber dedicated for use only in determining whether the MFC is functioning properly.

14. The method of claim 1, wherein a determination is made as to whether the MFC is opening or closing at rate different from a specified rate of opening or closing based on the comparison of the average of the pressure measurements with historical data.

15. The method of claim 11, wherein a determination is made as to whether the MFC is opening or closing at rate different from a specified rate of opening or closing based on the comparison of the gradient with historical data.

* * * * *